Aug. 30, 1949.  A. G. GOLDBERG  2,480,570
COLLAPSIBLE BABY CARRIAGE
Filed Jan. 24, 1946  4 Sheets-Sheet 1

Inventor
Abraham G. Goldberg,

By Clarence A. O'Brien
and Harvey B. Jacobson
Attorneys.

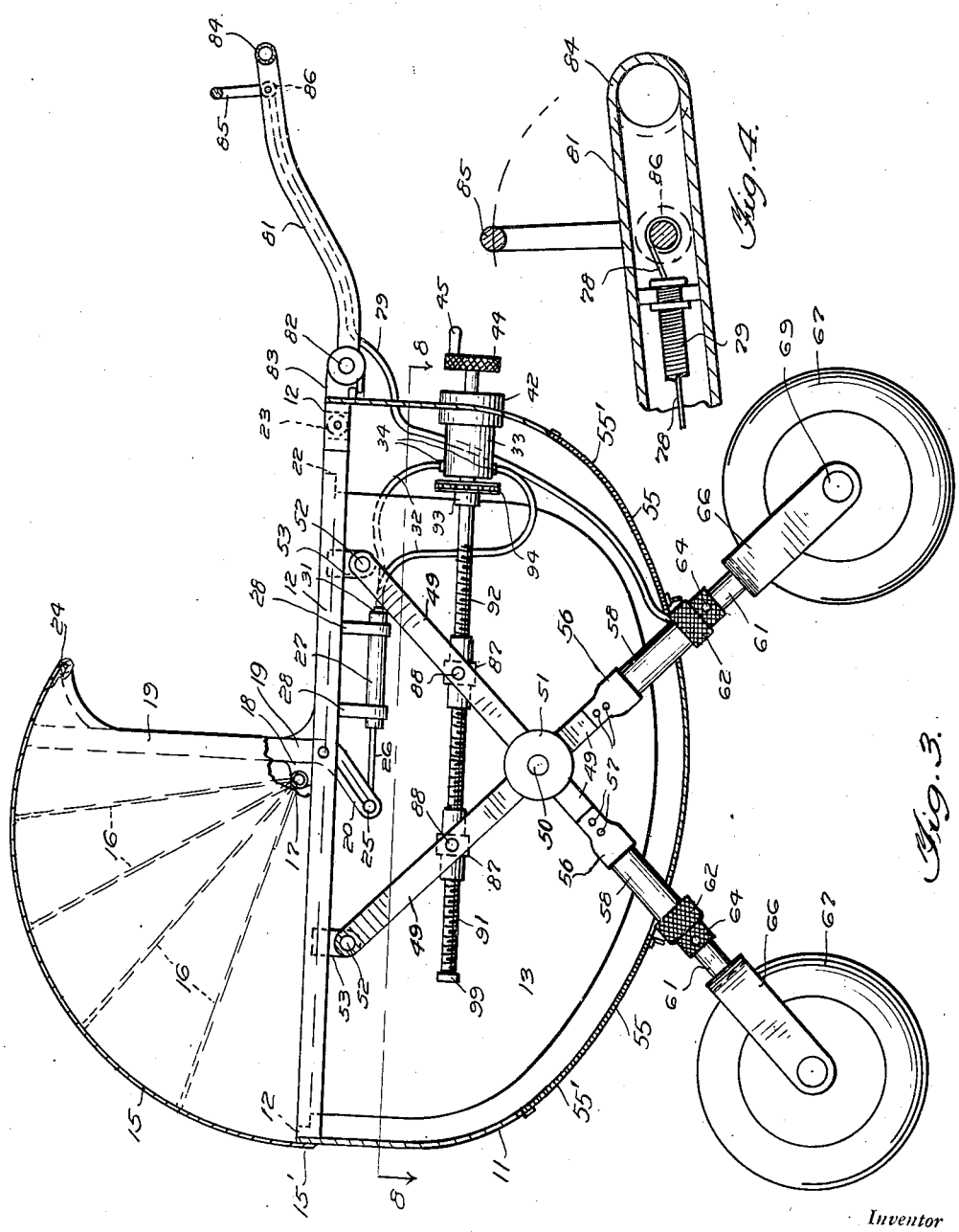

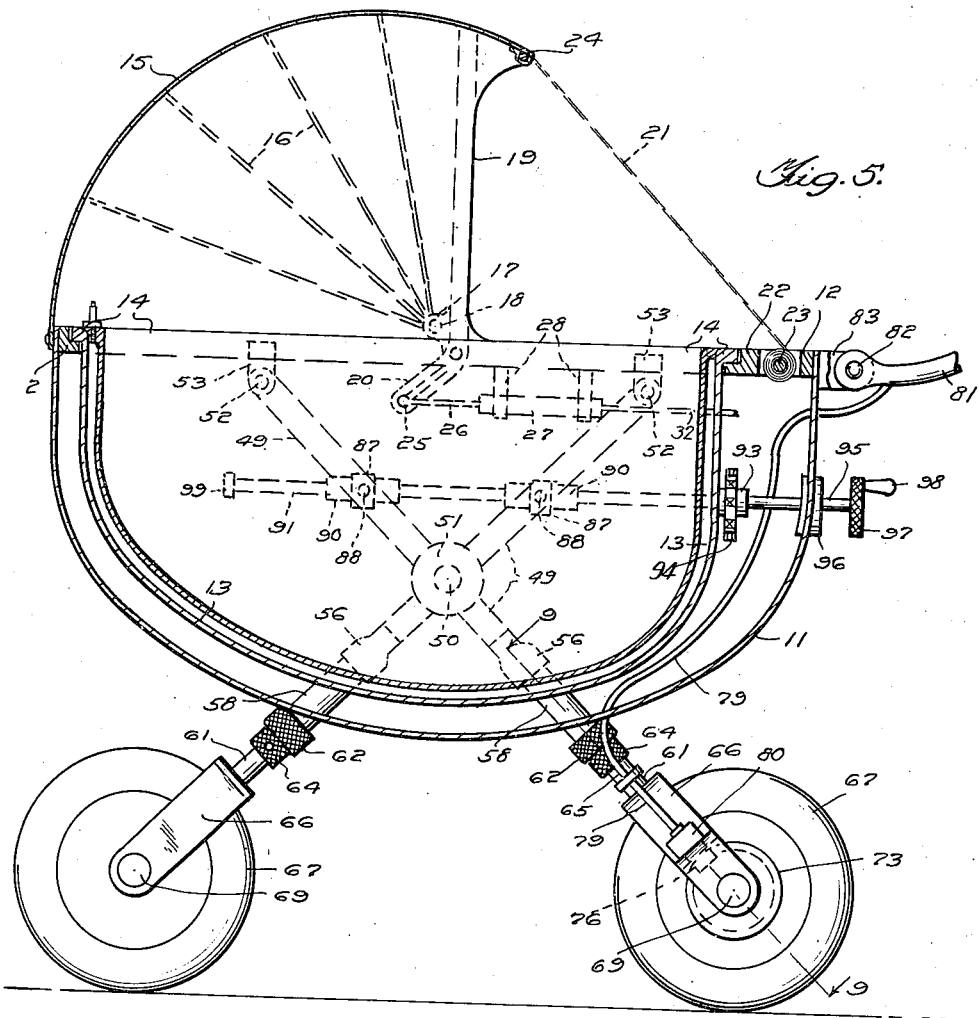
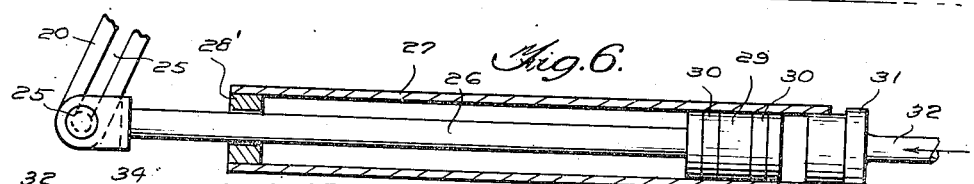

Aug. 30, 1949.  A. G. GOLDBERG  2,480,570
COLLAPSIBLE BABY CARRIAGE
Filed Jan. 24, 1946  4 Sheets-Sheet 4
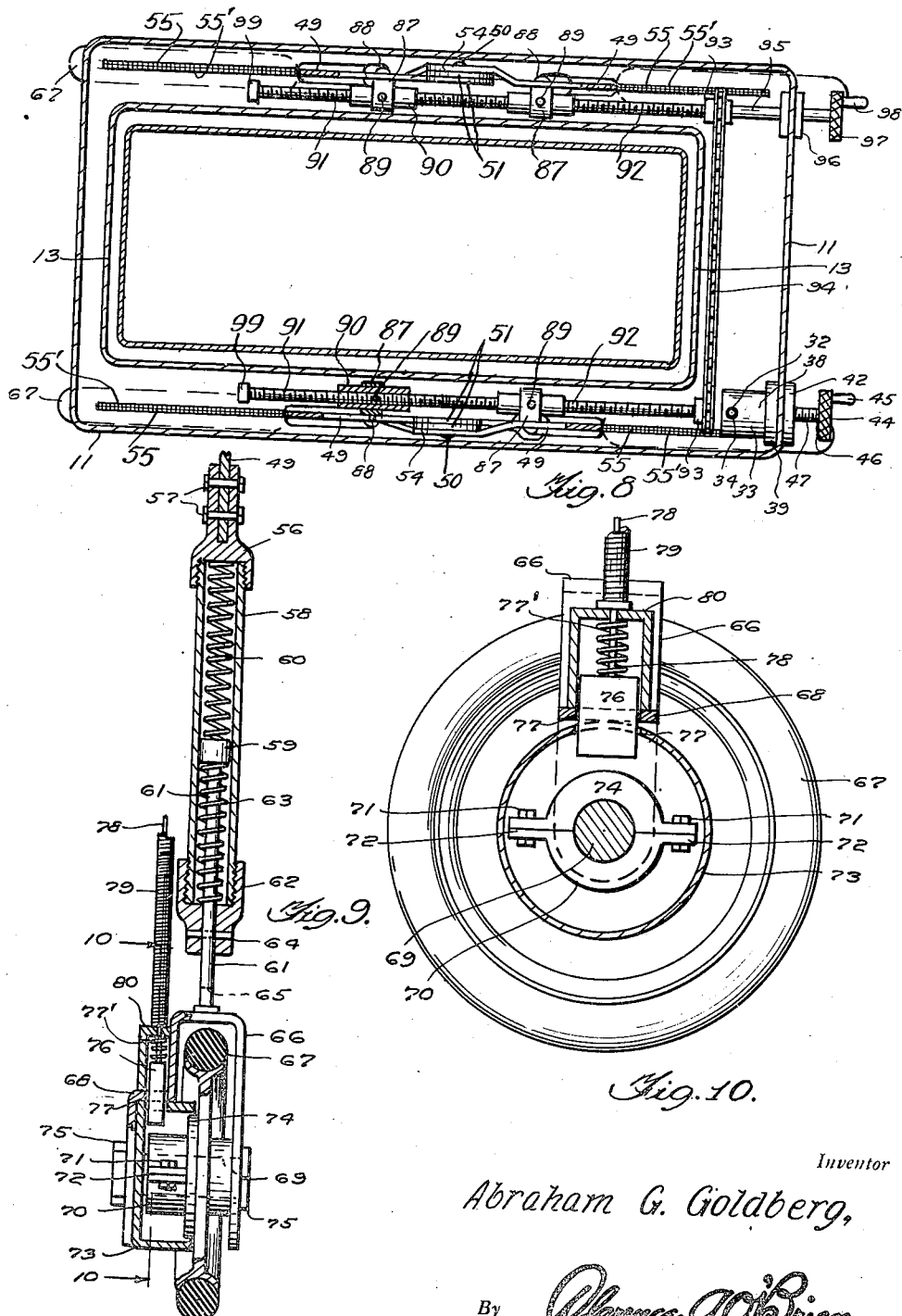
Inventor
Abraham G. Goldberg,
By Clarence A. O'Brien
and Harvey B. Jackson
Attorneys Patented Aug. 30, 1949

2,480,570

UNITED STATES PATENT OFFICE 2,480,570

COLLAPSIBLE BABY CARRIAGE

Abraham G. Goldberg, Chestnut Hill, Mass.

Application January 24, 1946, Serial No. 643,147

4 Claims. (Cl. 280—41)

This invention relates to baby carriages, and the object thereof is to provide a novel construction of baby carriage of modern design adapted to be extended or collapsed for use and in shipping and provided with novel means for causing the extension or collapse thereof including rubber tired wheels at least one of which is provided with a brake or like device to prevent the carriage from rolling when it is desired to retain the same standing still at one place, to provide means for causing the raising and lowering of the top of the carriage and to provide a rubberized collapsible and removable crib which is water-proof and a glare-proof protection screen or cover for the open part of the top or hood, together with means for operating the brake or locking device from the handle.

Another object of the invention is to provide a frame for the crib which is collapsible, including the handle and to provide hydraulic means for raising and lowering the top thereof as well as simple means for collapsing and extending the frame of the carriage including two X-shaped frame members having extensible and collapsible cross-bars or arms, the lower portions of which are provided for the mounting of the rubber tired wheels.

Another object of the invention is to provide a carriage having extremely simple but attractive design or lines and having a "Zipper" operated body permitting the collapse or extension of the wheel supporting arms, whereby the device may be compactly folded when not in use or for storage and shipment, as well as strong, durable and efficient in use.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal sectional view taken on the line 3—3 of Figure 2.

Figure 4 is an enlarged fragmentary detail showing the manner of operating the brake or wheel catch for holding the carriage stationary, taken on the line 4—4 of Figure 2.

Figure 5 is a central longitudinal sectional view taken on the line 5—5 of Figure 2.

Figure 6 is an enlarged longitudinal sectional view of the hydraulic cylinder and its piston, or device for extending and collapsing the body and top of the carriage.

Figure 7 is an enlarged fragmentary sectional view of the hydraulic cylinder for furnishing hydraulic pressure.

Figure 8 is a horizontal sectional view taken on the line 8—8 of Figure 3.

Figure 9 is an enlarged sectional view taken on the line 9—9 of Figure 5.

Figure 10 is an enlarged vertical sectional view taken on the line 10—10 of Figure 9.

Figure 1:
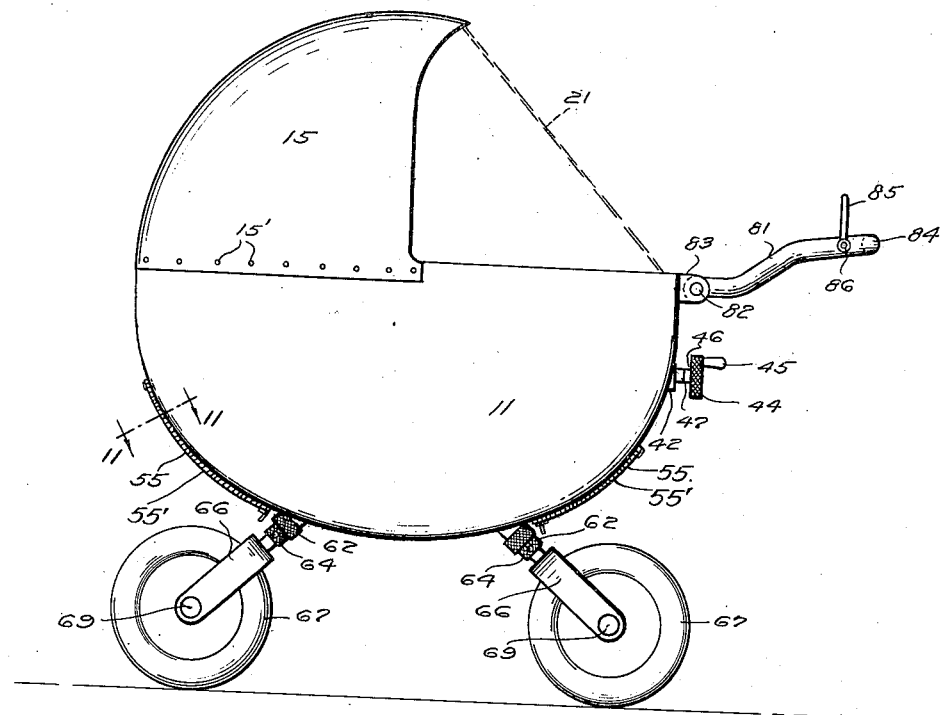
Figure 1 is a side elevation of a baby carriage constructed in accordance with the invention.
Figure 2:
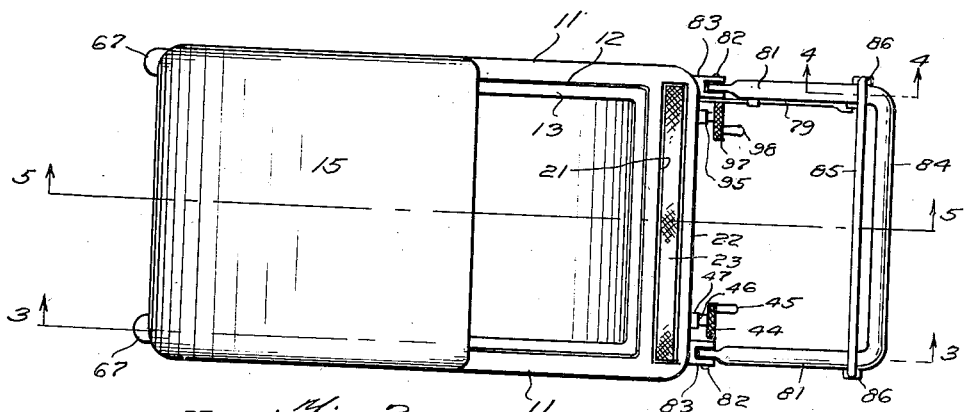
Figure 2 is a top plan view thereof.
Figure 11:
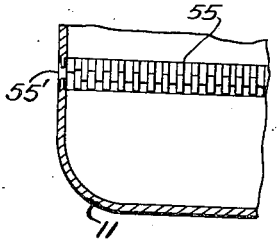
Figure 11 is an enlarged sectional detail view taken substantially upon the plan of the section line 11—11 of Figure 1.

Referring to the drawings in detail, in which like reference characters designate corresponding parts throughout the several views, the body of the carriage or crib is indicated at 11 and comprises a rectangular top frame 12 to which the concave flexible body portion 11 is attached so as to be hung or suspended therefrom. The frame is adapted to support a removable crib receptacle 13 of rubberized, inflatable material which is collapsible and removable, the same having a top frame 14 which is supported upon the right angle iron top frame 12 by seating therein at the inside, as shown in Figure 5 of the drawings. A collapsible top or hood 15 is provided for the crib, supported by a series of outwardly divergent and inwardly convergent frames or ribs 16 pivotally connected at 17 to a bracket 18 on a vertical frame 19, the sides of which have their lower ends formed with slotted arms 20 extending rearwardly at obtuse angles to said sides and at acute angles to the sides of the frame 12 and within the same. This hood covers one end of the carriage frame and crib and the other end is open, but is adapted to be closed by a curtain or glare-proof screen 21 mounted between the front end of the frame 12 and an angle iron or L-shaped cross-member 22 connecting the sides of the frame in spaced parallel relation to said front end or end member of frame 12 and mounted on a spring roller 23 having bearing in the sides of the frame and designed to be attached to the front edge of the hood by a catch or the like 24.

As means for extending and collapsing the hood or top 15, the slotted arms 20 are pivotally connected at 25 at one or both sides, with a plunger 26 operating in a hydraulic cylinder 27 suspended by brackets 28 at one or both sides of the frame 12 and clamped therein. The cylinder 27 is closed at its front end by a brass or other plug 28 with a driving fit through which the plunger 26 operates, the opposite end of the plunger within the cylinder having a piston or head 29 with rubber or leather seal rings 30 to insure a liquid seal for the oil contained in the cylinder. The head is closed by a steel or like plug 31 which may be sweated into position and from which a flexible tube 32 leads into a larger master cylinder 33, there being preferably two hydraulic cylinders 27, one at each side with separate tubes or oil lines 32 leading into the cylinder 33 at diametrically opposite sides through suitable cups or glands 34. The cylinder has a piston 35 operating therein behind the oil 36 and hung in from the front of the frame 12 by means of hangers or brackets 37 depending therefrom. An escape duct 38 is provided in back of the piston or plunger 35 in the cylinder 33 and said end is flanged as at 39 and riveted or otherwise fastened as by screws or the like 40 to the hangers in the form of a circular disc 41 conforming to the flange 39 and having an annular forwardly extending flange 42 with an annular groove 43 in its edge to receive a flanged knurled cap 44 which is provided with a handle 45 for turning the same. The cap 44 has a slotted shank or stub shaft 46 adapted to connect to the threaded piston rod 47 of the piston 35 in a socket 48 in the outer end of said rod, so as to be detachable therefrom since the threaded rod 47 projects through the front end of the crib body and provides means for turning the rod to force the piston forwardly or rearwardly to exert or release pressure on the oil to swing the frame 19 of the hood upwardly or downwardly to open or close the same. In this movement, the ribs 16 and hood or top 15 will collapse or be extended by reason of movement of the piston 29 and plunger 26 on the arms 20 in a horizontal line, the swinging of the U-shaped frame 19 and arms 20 in an arc being compensated for by the slots in the arms 20.

The running gear of the carriage includes two cross-arms 49 at each side pivoted intermediately at 50 and comprising four radiating arms held in sockets in opposed discs 51, with the central discs pivotally connected at 50 by a rivet or the like. The upper ends of the arms 49 are pivotally connected at 52 to hangers 53 attached to and depending from the sides of the frame 12, with the pivoted ends of the arms 49 offset laterally as indicated at 54 so as to pass one another, while the hangers 53 may be slidable along the frame sides. The crib body 11, which is concave at the bottom, is provided with corner slots 55' at the junctures of the bottom and sides connected by "Zippers" 55 so as to allow the lower ends of the arms 49 to extend therethrough in applying the flexible body 11 and in extending and collapsing the frame arms and wheels 67 supported at the lower ends of the arms. For this purpose, slotted sockets 56 are fastened to the lower arms as at 57 and the sockets are internally threaded to receive cylinders 58 in each of which a plunger 59 is movable. A spring 60 is interposed between the sockets or end of the cylinder and plunger 59, and the plunger stem or rod 61 passes through a socket 62 at the other end of the cylinder 58 and has a spring 63 between the plunger and the socket 62 encircling the rod 61 to give effective cushioning means for the wheels. The socket 62 is preferably in the form of a knurled sleeve 62 pinned at 64 through a slot 65 in the plunger 61, which latter carries a fork 66 at its lower end, in which a rubber tired wheel 67 is journaled. One of the forks or bearings 66 is provided with an offset portion 68, although this may be provided on one or more of the forks if desired, so as to journal the hub or shaft 69 of the wheels. On said hub or shaft, semi-circular straps 70 are bolted as at 71; the same having diametrically opposite arms 72 where the ends of the straps are bolted together and a flanged cap or drum 73 is mounted on the shaft or hub 69 within the offset portion 68 to extend over the peripheral edge of the disc 74 at the side of the wheel also provided on the shaft, which shaft has a threaded end to take a hub cap or nut 75. A spring latch bolt 76 extends through openings 77 in the rim or flange of the cap 73 and the offset portion 68 of the fork 66 which is adapted to be held in by a spring 77' and constitutes a locking or braking pin against the periphery of the cap or drum 73 or to ride into the openings 77 to hold the carriage stationary. The bolt or pin 76 has the shank thereof connected to a cable 78 in a flexible tubing 79 connected to an open-ended housing 80 for the bolt or pin 76 mounted on the offset portion and side of the fork 66, which flexible shaft 78 and tubular casing 79 extend upwardly at the back of the body and into one arm of a tubular U-shaped handle 81 having its legs or extremities pivoted at 82 to apertured ears 83 at each side of the frame and projecting rearwardly therefrom. Near the cross-bar 84 of the handle, a U-shaped lever 85 is pivoted in sleeves 86 through the sides or legs of the handle and has the cable 78 secured and wound thereon so that by moving the lever 85, the cable may be released to permit engagement of the bolts or brakes or to release the same when the cable is wound against the action of the spring 77' which automatically projects the bolts when the cable is unwound. This may be operated conveniently at the lever 85 while holding the cross-bar 84 of the handle 81, so that the brake may be applied to the drum and will snap automatically into the openings 87 to hold the carriage stationary when it is desired to have the same remain in one place.

As means for operating the arms 49 to extend or collapse the supporting frame, constituting the running gear of the carriage, U-shaped brackets 87 are pivoted or swivelled at 88 on the upper arms 49 intermediately of their lengths at the bight portions of the brackets 87 with the arms extending inwardly one above the other. Pivoted to the upper and lower arms of the U-shaped brackets 87, as at 89, are internally threaded sleeves or nuts 90 which are engaged with oppositely threaded screws 91 and 92 and have their inner ends adjacent each other. The outer ends of the screws 92 have sprocket wheels 93 mounted thereon over which an endless chain 94 is trained in the space between the crib 13 and the body 11 of the crib. One screw 92 is extended through the back of th body as indicatd at 95 through a bearing 96 and has a knurled crank disc 97 with a handle 98 by which it may be turned to simultaneously operate the screws 92 for extending and collapsing the running gear or wheeled frame. When the inner ends of the screws abut, the opening of the frame is limited and thereby held rigid. The screws 91 are manually adjusted and have heads 99 for this purpose so that the extension of the arms may be regulated or the screws 91 retracted to permit collapsing of the frame into compact form together with the body and other parts of the crib structure for occupying a small space for storage or shipment. Attention is also directed to the fact that the screw guide 42 is preferably brazed or welded to the frame member 37, and may be held by a nut 100 as shown in Figure 7 of the drawings constituting a bearing for the plunger in moving in and out when turned by the handle 45.

It will thus be seen that I have provided a very modern design and construction of crib which is novel and attractive, as well as extremely simple and light in construction and which may be very economically and efficiently manufactured and assembled while providing an entirely new departure from carriage construction for babies. The removable crib is very desirable and especially where rubberized, inflatable and collapsible, and will form protection in use.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim:

1. A baby carriage comprising a top frame of rectangular form, a handle pivotally connected thereto, crossed arms pivotally connected to each other and to the sides of the frame and pivoted to one another where crossed, forks at the lower ends of the arms, spring-pressed plungers in the arms and connected to the forks below the pivots thereof, a flexible body suspended from the frame and through which said arms extend, cushioning means in the arms, wheels journaled in the forks, said flexible body having slots adapted to be closed and designed to receive the arms therethrough, and braking means cooperative with the wheels and operative from the handle to prevent movement of the carriage.

2. A baby carriage comprising a top frame of rectangular form, a handle pivotally connected thereto, crossed arms pivotally connected to each other and to the sides of the frame, forks at the lower ends of the arms, a flexible body suspended from the frame and through which said arms extend, cushioning means in the arms, wheels journaled in the forks, said flexible body having slots adapted to be closed and designed to receive the arms therethrough, and means connected to the arms and operable from the back of the body and frame for extending and collapsing the arms and wheels.

3. A baby carriage comprising a top frame of rectangular form, a handle pivotally connected thereto, crossed arms pivotally connected to the sides of the frame and pivoted to one another where crossed, forks at the lower ends of the arms, a flexible body suspended from the frame and through which said arms extend, cushioning means in the arms, wheels journaled in the forks, said flexible body having slots adapted to be closed and designed to receive the arms therethrough, screws swivelled to the upper portions of the arms and having threaded nuts pivoted to the arms, said screws being oppositely threaded and disposed adjacent each other at their inner ends, two of said screws being manually adjustable, driving connections between the opposite ends of the other screws, and means for turning one of the screws from the outside of the body at the rear thereof to move the two screws in opposite directions for swinging the arms into extended position substantially at right angles to each other or for collapsing the same toward each other together with the wheels.

4. A baby carriage comprising a top frame of rectangular form, a handle pivotally connected thereto, arms pivotally connected to the sides of the frame and crossing one another, said arms being pivotally connected where crossed, forks at the lower ends of the arms, a flexible body suspended from the frame and through which said arms extend, cushioning means in the arms, wheels journaled in the forks, said flexible body having slots adapted to be closed and designed to receive the arms therethrough, screws swivelled to the upper portions of the arms and having threaded nuts pivoted to the arms, said screws being oppositely threaded and disposed adjacent each other at their inner ends, two of said screws being manually adjustable, driving connections between the opposite ends of the other screws, and means for turning one of the screws from the outside of the body at the rear thereof to move the screws in opposite directions for swinging the arms into extended position substantially at right angles to each other or for collapsing the same toward each other together with the wheels, said arms having forks in which the wheels are journaled, at least one of the forks having an offset portion, a spring bolt mounted on said offset portion, said offset portion having an opening, brake means associated with the wheel in the offset portion selectively rendered operative and inoperative by said spring bolt.

ABRAHAM G. GOLDBERG.

REFERENCES CITED

The following references are of record in the file of this patent:

UNITED STATES PATENTS

| Number | Name | Date |
|---|---|---|
| 1,709,527 | Ford | Apr. 16, 1929 |
| 1,856,491 | Mahr | May 3, 1932 |
| 2,244,154 | Hendrickson | June 3, 1941 |
| 2,257,943 | Feldman | Oct. 7, 1941 |
| 2,351,803 | Best | June 20, 1944 |
| 2,378,931 | Kiesow | June 26, 1945 |
| 2,395,208 | Wylie | Feb. 19, 1946 |
| 2,446,302 | Newberry | Aug. 3, 1948 |

FOREIGN PATENTS

| Number | Country | Date |
|---|---|---|
| 187,572 | Switzerland | Apr. 1, 1937 |
| 254,440 | Great Britain | July 8, 1926 |
| 286,005 | Germany | July 17, 1916 |
| 357,914 | Great Britain | Oct. 1, 1931 |
| 479,091 | Great Britain | Jan. 31, 1938 |
| 544,227 | France | June 16, 1922 |
| 667,061 | Germany | Nov. 3, 1938 |